United States Patent
Hodkisson et al.

(10) Patent No.: US 9,254,927 B2
(45) Date of Patent: Feb. 9, 2016

(54) RETRACTABLE INFILL PANEL FOR HIGH-LIFT DEVICE

(71) Applicant: AIRBUS OPERATIONS LIMITED, Bristol (GB)

(72) Inventors: Mark Hodkisson, Horam (GB); James Wilson, Winscombe (GB); Samuel Evans, Warminster (GB)

( * ) Notice: Subject to any disclaimer, the term of this patent is extended or adjusted under 35 U.S.C. 154(b) by 65 days.

(21) Appl. No.: 14/084,828

(22) Filed: Nov. 20, 2013

(65) Prior Publication Data
US 2014/0138487 A1     May 22, 2014

(30) Foreign Application Priority Data
Nov. 20, 2012 (GB) .................................. 1220854.2

(51) Int. Cl.
*B64D 45/00* (2006.01)
*B64C 9/24* (2006.01)

(52) U.S. Cl.
CPC .. *B64D 45/00* (2013.01); *B64C 9/24* (2013.01)

(58) Field of Classification Search
CPC .................................. B64D 45/00; B64C 9/24
USPC ................................ 244/214, 216, 218, 129.2
See application file for complete search history.

(56) References Cited

U.S. PATENT DOCUMENTS

| 5,845,877 | A * | 12/1998 | Justice et al. | 244/131 |
|---|---|---|---|---|
| 6,682,023 | B2 * | 1/2004 | Broadbent | 244/219 |
| 7,766,281 | B2 * | 8/2010 | Lorkowski et al. | 244/215 |
| 8,534,611 | B1 * | 9/2013 | Pitt et al. | 244/214 |
| 2010/0133387 | A1 * | 6/2010 | Wood et al. | 244/219 |
| 2012/0061523 | A1 * | 3/2012 | Havar et al. | 244/214 |

FOREIGN PATENT DOCUMENTS

| GB | 2380173 A | 4/2003 |
|---|---|---|
| WO | 2006133940 A1 | 12/2006 |
| WO | 2008084260 A2 | 7/2008 |

OTHER PUBLICATIONS

Corresponding United Kingdom Application No. 1220854.2 Search Report dated Mar. 18, 2013.

* cited by examiner

*Primary Examiner* — Justin Benedik
(74) *Attorney, Agent, or Firm* — Hauptman Ham, LLP

(57) ABSTRACT

The present invention provides an aircraft assembly with a fixed structure and a high-lift device. The fixed structure has a spar, a forward part which provides a foremost edge of an aircraft wing, and a lower part which provides a lower surface of the aircraft wing. A high-lift device is downwardly movable relative to the fixed structure from a stowed configuration to a deployed configuration. The high-lift device has a forward part which provides a foremost edge of the aircraft wing and a lower part which provides a lower surface of the aircraft wing. Downward movement of the high-lift device causes progressive opening of a lateral gap between the lower part of the high-lift device and the lower part of the fixed structure. A retractable infill panel is arranged to progressively extend from a retracted configuration to an extended configuration to fill the lateral gap.

18 Claims, 8 Drawing Sheets

RETRACTABLE INFILL PANEL FOR HIGH-LIFT DEVICE

RELATED APPLICATIONS

The present application is based on and claims priority to United Kingdom Application Number 1220854.2, filed Nov. 20, 2012, the disclosure of which is hereby incorporated by reference herein in its entirety.

FIELD OF THE INVENTION

The present invention relates to a retractable infill panel for sealing a gap between a fixed leading edge structure of an aircraft wing and a movable high-lift device, in particular for preventing ingress of fire or debris.

BACKGROUND OF THE INVENTION

Some fixed wing aircraft have leading edge high-lift devices such as droop nose devices or slats which are downwardly movable relative to the fixed structure of the wing from a stowed configuration to a deployed configuration. Deployment of such devices relative to the fixed structure causes a lateral gap to progressively open between a lateral edge of the high-lift device and the fixed structure. Such gaps can cause systems and structure within the fixed wing structure to become exposed to the risk of fire or debris ingress, or can alternatively impose an aerodynamic penalty on the aircraft.

Previous solutions have included a false floor attached to the fixed structure, but such a solution is not always practicable and also adds weight to the aircraft.

SUMMARY OF THE INVENTION

The present invention provides an aircraft assembly comprising a fixed structure comprising a spar, a forward part which provides a foremost edge of an aircraft wing, and a lower part which provides a lower surface of the aircraft wing. A high-lift device is connected to the spar so as to be downwardly movable relative to the fixed structure from a stowed configuration to a deployed configuration, wherein the high-lift device comprises a forward part which provides a foremost edge of the aircraft wing and a lower part which provides a lower surface of the aircraft wing. Downward movement of the high-lift device causes progressive opening of a lateral gap between the lower part of the high-lift device and the lower part of the fixed structure. A retractable infill panel is arranged to progressively extend from a retracted configuration to an extended configuration to fill the lateral gap.

The infill panel acts to fill the lateral gap as the device deploys, but is retracted when the device is stowed. In its extended configuration the infill panel provides a seal concealing the lateral gap, and in its retracted configuration the infill panel is conveniently stowed away.

Stowing away the infill panel in its retracted configuration ensures that it does not clash with any systems (such as electrical cabling, hydraulic pipes, or fuel lines) running along the wing.

The infill panel is preferably attached to the high-lift device (typically at a lower edge of the infill panel) and to the fixed structure (typically at an upper edge of the infill panel). Thus, the infill panel is arranged to automatically extend from the retracted configuration to the extended configuration in response to movement of the device to the deployed configuration, and vice versa. That is, the movement of the device itself causes movement of the infill panel between the retracted and extended configurations, and there is no need for any separate actuation mechanism.

Preferably the panel progressively extends to fill the gap during movement of the device to the deployed configuration. Alternatively a separate actuation mechanism may be provided to progressively extend the panel to fill the gap after the device has been deployed.

In the retracted configuration the infill panel is preferably contracted (for instance by being folded) and in the extended configuration the infill panel is preferably expanded (for instance by being unfolded). By contracting in this way, the infill panel can be fit into a compact volume when the device is in its stowed configuration. The infill panel is preferably arranged to fold at one or more fold lines which provide one fold or a series of folds in alternating directions. That is, the infill panel is preferably arranged to fold in a concertina-type or fan-type arrangement.

In some embodiments the infill panel comprises a flexible substrate supported by a plurality of stiffening portions. The stiffening portions may serve to prevent lateral distortion of the infill panel in the extended configuration, and may also serve to aid retraction to the retracted configuration.

Preferably the infill panel is arranged to fold at each of a plurality of fold lines in the flexible substrate, each fold line being adjacent one of the plurality of stiffening portions. In some embodiments the stiffening portions each comprise an elongate rod.

In other embodiments the stiffening portions each comprise a moulded-in stiffening plate, neighbouring stiffening plates being separated by a fold line.

Optionally the aircraft assembly further comprises a biasing element which biases the infill panel towards its retracted configuration. The biasing element may be integrated into the infill panel or may be provided as a separate part.

The infill panel is preferably arranged to provide a barrier to one or more of: fire; debris; and air flow. Thus, the infill panel may prevent ingress of flames, air-borne debris, and/or drag-inducing air flows, respectively.

Preferably the lower part of the high-lift device lies flush with the lower part of the fixed structure when the device is in its stowed configuration.

Preferably the forward part of the high-lift device lies flush with the forward part of the fixed structure when the device is in its stowed configuration.

The high-lift device typically has an inboard and an outboard end, the inboard end being positioned closer to a centre plane of the aircraft than the outboard end. The lateral gap may be at the inboard end or the outboard end of the high-lift device.

The infill panel may be attached at or adjacent a lateral edge (that is, an inboard or outboard edge) of the device. The infill panel may have upper and lower edges which are at an acute angle to one another in the extended configuration.

Preferably the fixed structure and/or the high lift device further comprises an upper part which typically provides an upper surface of the aircraft wing. The upper and/or lower part of the high-lift device typically seals with fixed secondary structure in the stowed position and/or the deployed position. The secondary structure is typically supported by one or more ribs which are connected to the spar.

The forward, lower and upper parts of the fixed structure are typically fixedly attached to the spar, either directly or via ribs.

The forward and lower parts of the fixed structure may be formed as separate members, or as a single monolithic member. Similarly the forward and lower parts of the high-lift device may be formed as separate members, or as a single monolithic member.

The high-lift device may comprise a droop nose device, slat, or any other device which increases the camber (and hence lift) of the leading edge of the wing when in its deployed position.

The high-lift device preferably has a partially deployed configuration between the stowed configuration and the deployed configuration, and the a retractable infill panel is preferably arranged to progressively extend from the retracted configuration to a partially extended configuration to fill the lateral gap when the high-lift device deploys from the stowed configuration to the partially deployed configuration. In this way, the device can be deployed to different positions for different flight phases, while still maintaining a seal concealing the lateral gap.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
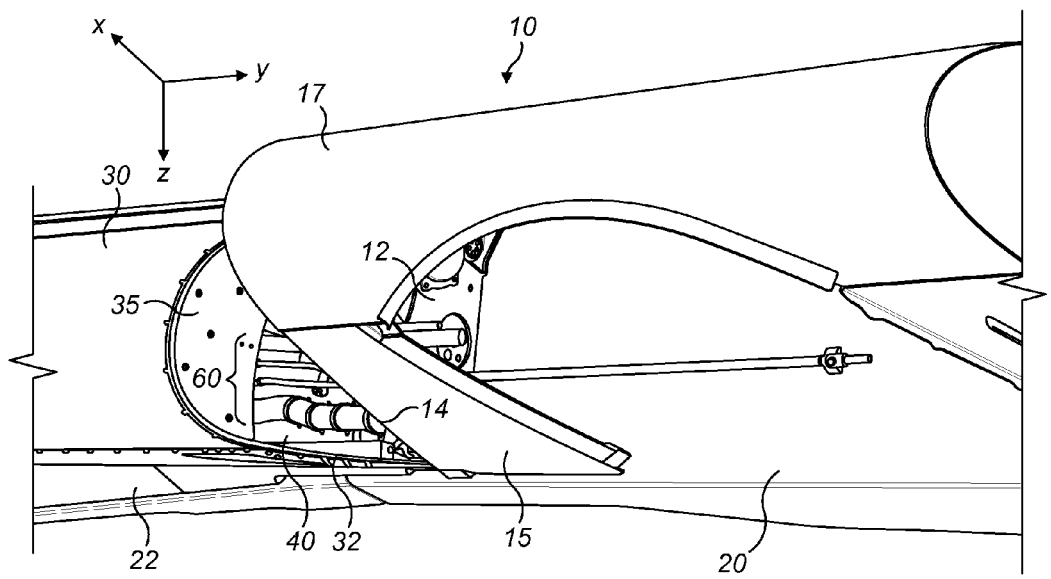
FIG. 1 shows an isometric view of a leading edge aircraft wing assembly having a droop nose device shown in its deployed position, viewed in a rearward-inboard direction.

FIG. 1 shows a leading edge wing assembly with a fixed leading edge structure including a front spar 20 (omitted in FIGS. 2 and 3 for clarity), a fairing or nose structure 10 fixedly attached to the spar, and pylon primary structure (not shown) which serves to attach a gas turbine engine or other engine (now shown) to the wing. The fixed structure also includes an inboard closing rib 12, which provides a lateral barrier separating the pylon primary structure from a deployable droop nose device 30 located inboard of the fairing 10, and to which the fairing 20 is attached. Orthogonal xyz axes are shown in FIGS. 1-3—the x-axis indicating the forward direction, the y-axis the outboard direction (away from the centre of the aircraft) and z-axis the downward direction.

The fairing 10 has a curved forward nose part 17 which forms the foremost edge of the airfoil profile of the aircraft wing, and lower and upper parts 15, 16 which extend aft of the forward part 17 and provide lower and upper surfaces of the aircraft wing respectively. The upper part 16 is shown most clearly in FIGS. 2 and 3. The parts 15-17 may be formed as a single monolithic member, or as separate panels. In this example the part 15 is a separate access panel which is attached by removable fasteners to the part 17 and can be removed to gain access to the space above it.

The droop nose device 30 is hinged to the front spar 20 on five hinge ribs which are attached to the spar 20. The device is pivotable downwardly between a stowed configuration (FIG. 2) in which its outer surface is flush with the outer surface of the fairing 10 and a deployed configuration (FIGS. 1 and 3) in which its outer surface is lowered relative to the outer surface of the fairing 10. When the device is deployed the airfoil profile of the wing in the region of the device 30 is modified so its camber is increased. The droop nose device 30 may have a partially deployed configuration which is an intermediate position between the stowed and deployed configurations.

Figure 2:
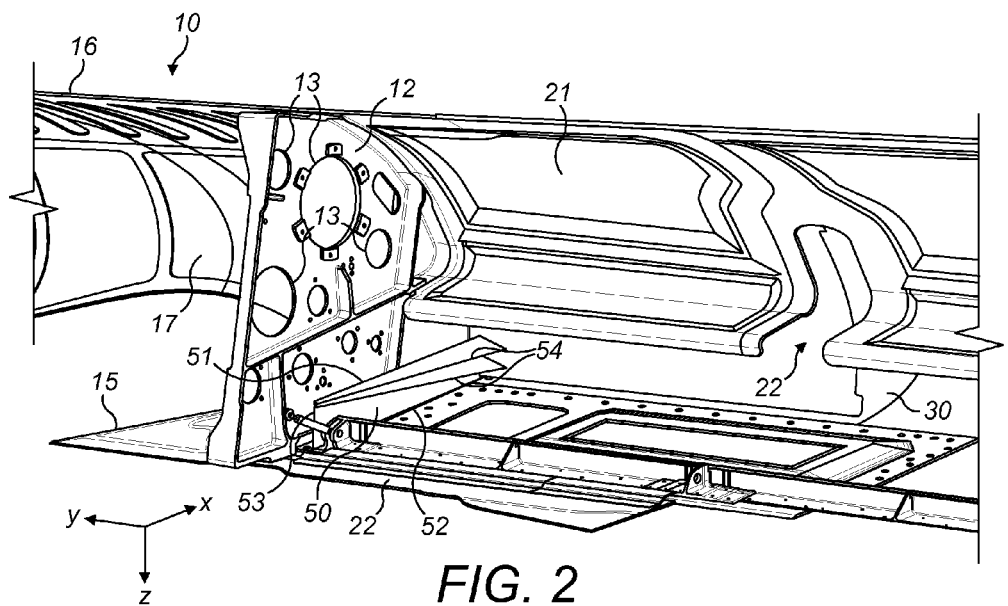
FIG. 2 shows an alternative isometric view of the wing assembly of FIG. 1 with the droop nose device in its stowed position and a retracted infill panel according to an embodiment of the present invention, viewed in a forward-outboard direction.
Figure 3:
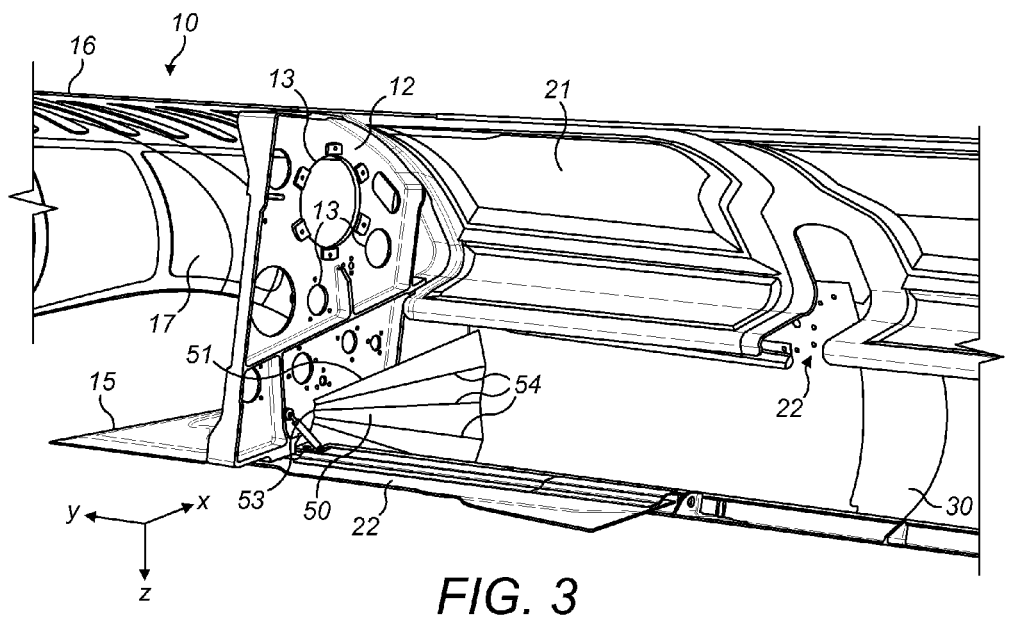
FIG. 3 shows the arrangement of FIG. 2 with the droop nose device in its deployed position and the infill panel in an extended configuration.
Figure 4:
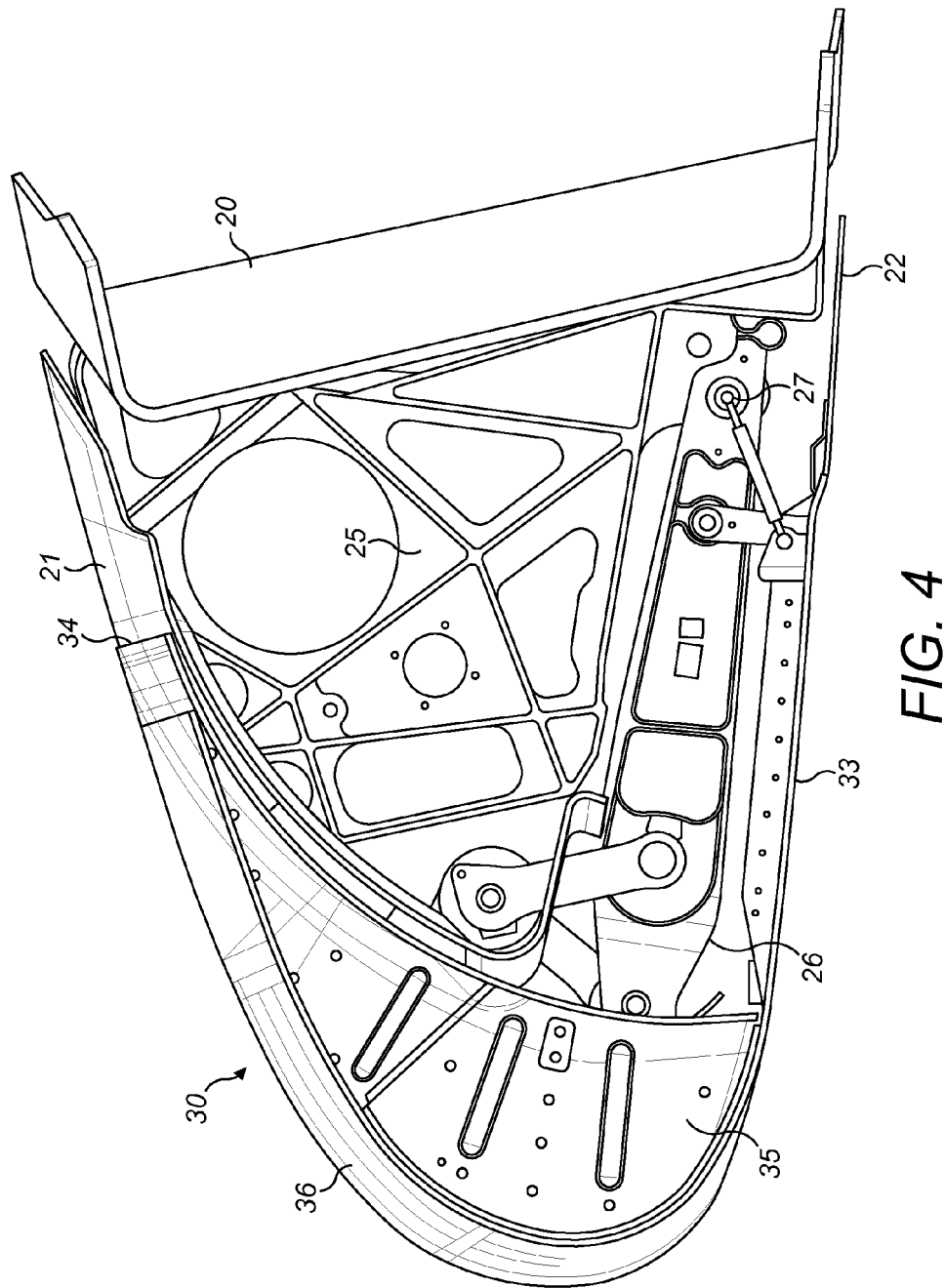
FIG. 4 is a sectional side view showing the droop nose device in its stowed position.

The front spar 20 supports an upper fixed secondary structure panel 21 shown in FIGS. 2 and 3 with a slot 22. The outboard one of the five hinge ribs is omitted from FIGS. 2 and 3 and is received in the slot 22 in the panel 21. FIG. 4 is a sectional side view showing this outboard hinge rib 25 along with an actuator arm 26 which is pivotally attached to the hinge rib 25 at a hinge 27 and is also omitted from FIGS. 2 and 3.

Figure 5:
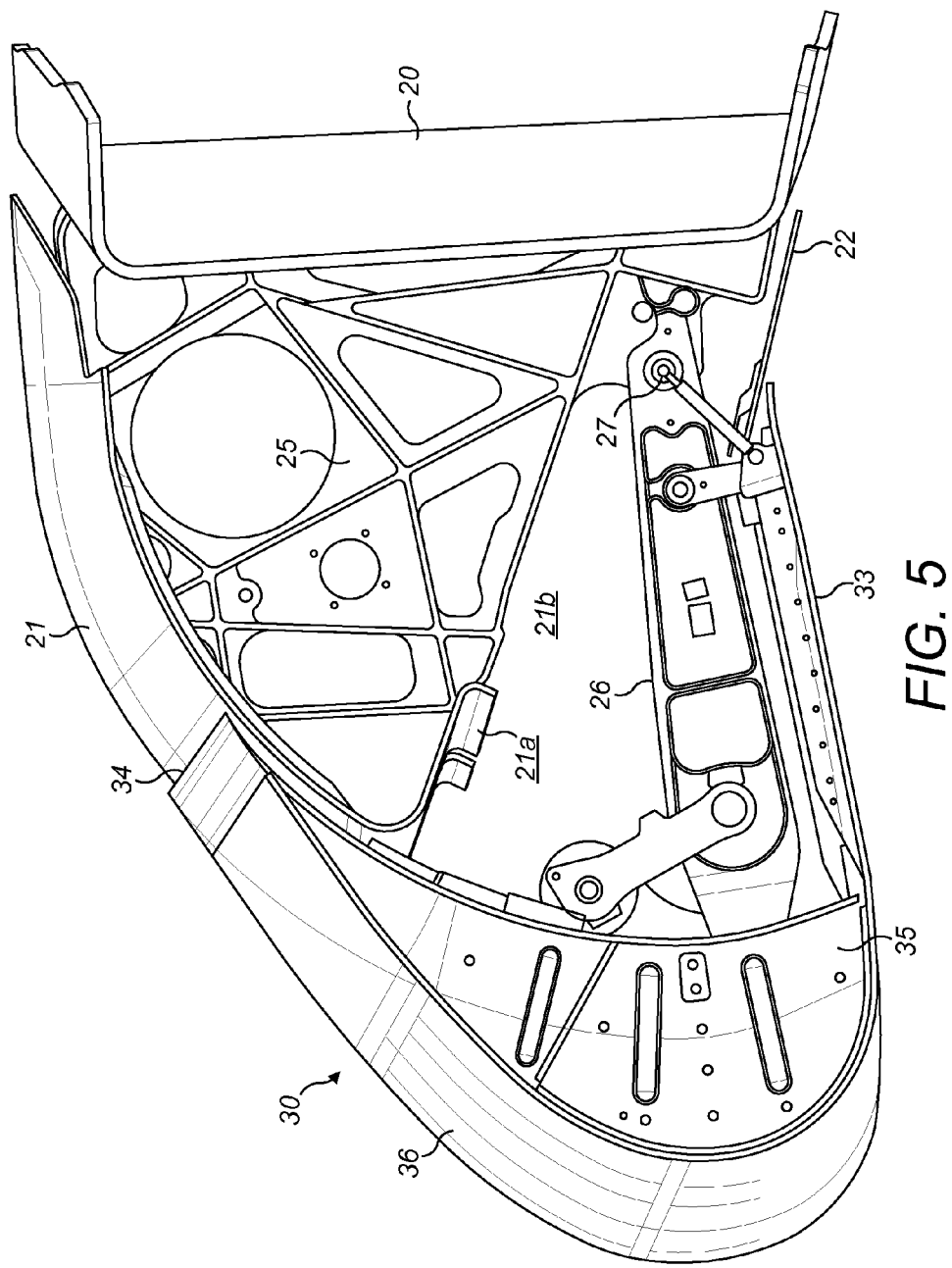
FIG. 5 is a sectional side view showing the droop nose device in its fully deployed position.

FIG. 4 shows the device 30 in its stowed position and FIG. 5 shows the device 30 in its fully lowered position.

The outer profile of the droop nose device 30 has three parts which are labelled in FIGS. 4 and 5. A curved forward part 36 forms the foremost edge of the device (and of the airfoil profile of the aircraft wing) and lower and upper parts 33, 34 extend aft of the forward part 36 and provide lower and upper surfaces respectively of the device (and of the aircraft wing). The lower part 33 has an outboard edge labelled 32 in FIGS. 1, 6 and 7. The parts 33, 36 may be formed as a single monolithic member, or as separate panels. The part 34 is typically formed as a separate seal member which is attached to the part 36 by fasteners.

As shown in FIG. 4, when the device is stowed the lower part 33 of the device seals with a lower fixed secondary structure panel 22 which is attached to and extends forwardly from the spar 20. The upper part 34 of the device seals with the upper secondary structure panel 21 in both the retracted position of FIG. 4 and the extended position of FIG. 5. The device 30 also has a closing rib 35 at its inboard end, labelled in FIGS. 1 4, 5 and 8.

Typically, the droop nose device 30 is deployed during take-off and landing in order to increase the camber of the wing (and hence increase the aerodynamic lift generated by the wing) and subsequently stowed during cruise. During take-off the device 30 may be deployed to the partially deployed configuration (e.g. pivoted through 18 degrees), while during landing the device may be deployed to the deployed configuration (e.g. pivoted through 27 degrees).

Figure 6:
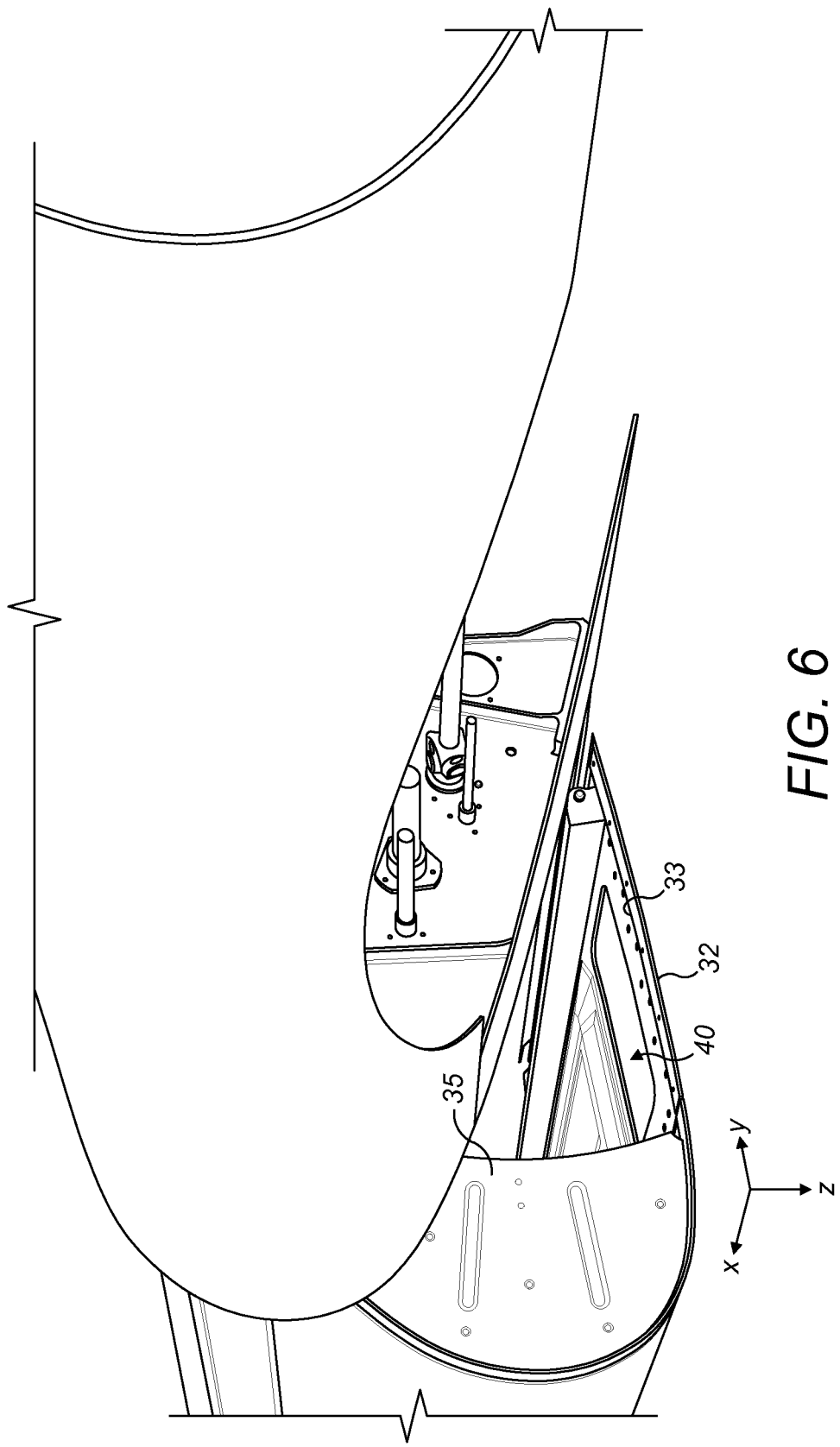
FIG. 6 shows an isometric view of the assembly with the droop nose device shown in its deployed position, viewed in a rearward-inboard direction, with the infill panel omitted.

As shown in FIGS. 1 and 6, when the droop nose device 30 is deployed a generally triangular lateral opening, or gap, 40 is exposed at its outboard end, bounded by an inboard edge 14 of the lower part 15 of the fairing 10, an outboard edge 32 of the lower part 33 of the droop nose device, and a rear edge of the side rib panel 35. In prior art arrangements such a gap 40 may not be of concern because the secondary structure panel 21 of such arrangements may extend to join the spar 20 at its lower edge, thus providing a false floor which provides a closed volume protecting the spar and other elements of the fixed leading edge assembly, rather than terminating at a lower edge 21a shown in FIG. 5 which is spaced apart from the spar 20 and the forward edge of the panel 22 by a gap 21b. However, without such a false floor there is a risk that, in the event of an engine fire, flames may pass through the gap 40 and damage critical systems infrastructure 60 (see FIG. 1; not shown in FIGS. 2, 3 and 6 for clarity) which form part of the fixed wing assembly behind the droop nose device such as electrical cabling, hydraulic pipes and fuel lines.

It is also essential that flames be prevented from crossing from within the droop nose device 30 into the space behind the fairing 10 via the inboard pylon rib 12. As can be seen from FIGS. 2 and 3, the inboard pylon rib 12 has a plurality of systems penetration apertures 13 through which the cabling, pipes and lines of the systems infrastructure 60 are routed. Should such a cable, pipe or line be destroyed by fire, it would leave an unfilled penetration aperture 13 which would provide a route for flames to enter the fairing 10. Although it may in some cases be possible to provide a heat insensitive material between the cable, pipe or line and the penetration aperture 13 to prevent such melting, such heat protection is not suitable for use with e.g. electrical cables which generate a large amount of heat during normal operation, such as generator cables transmitting electrical energy generated by the aircraft engine.

Figure 7:
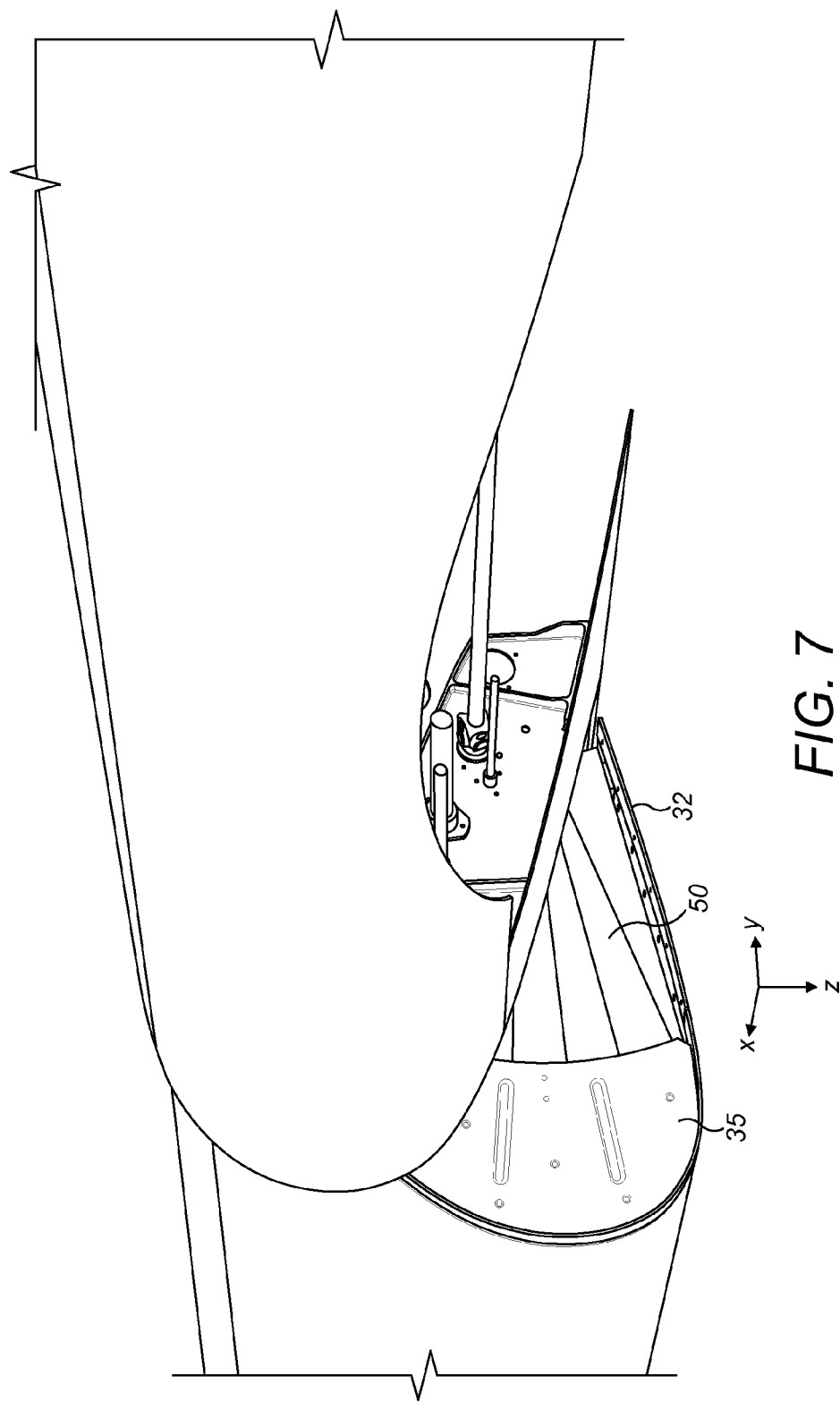
FIG. 7 shows the view of FIG. 6 with the infill panel shown.
Figure 8:
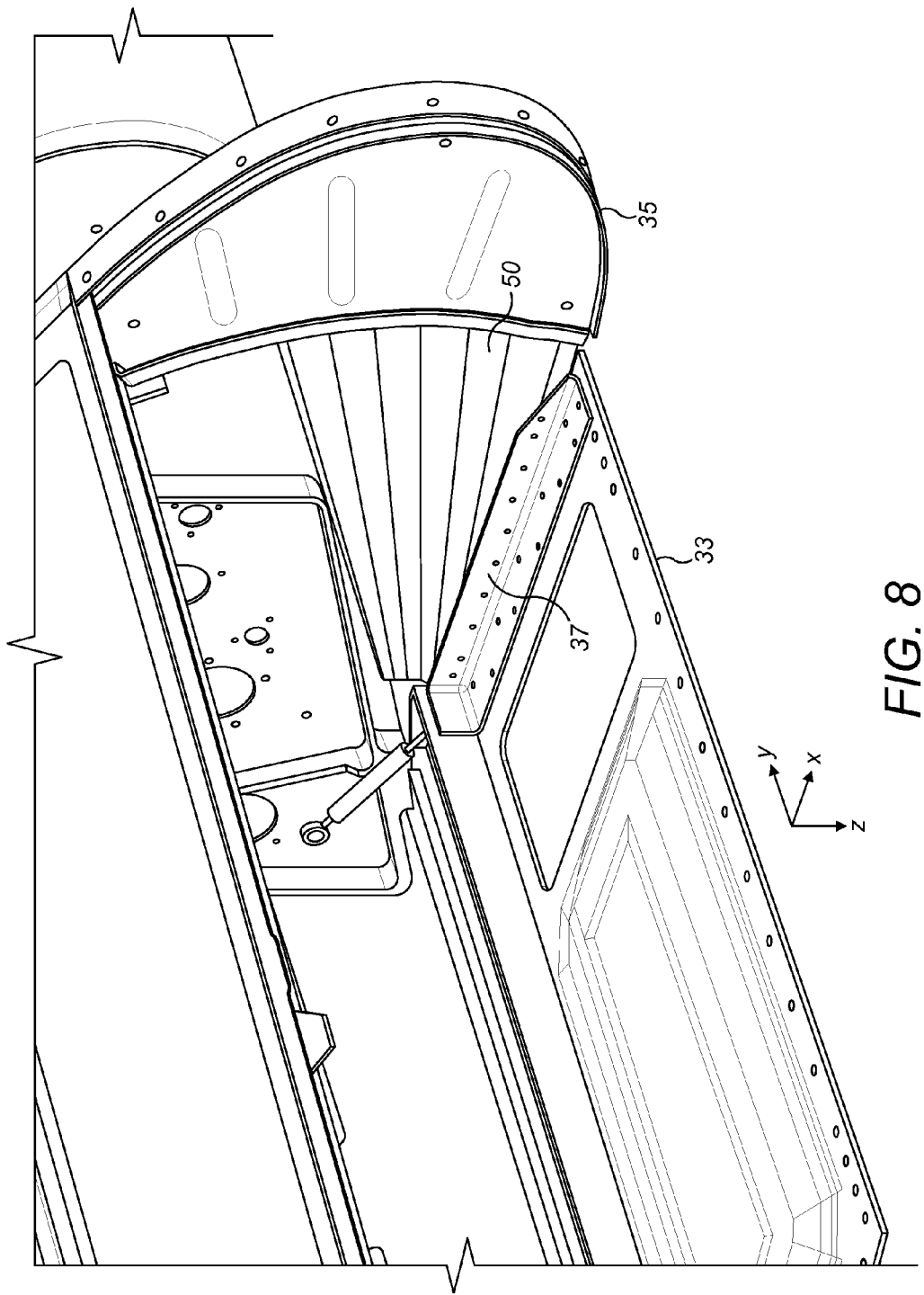
FIG. 8 shows an isometric view the wing assembly of FIG. 1 with the droop nose device in its deployed position and part of the outer skin of the droop nose device removed, viewed in a rearward-outboard direction.

A retractable infill panel 50 shown in FIGS. 2, 3, 7 and 8 solves the above problems by providing a fire resistant barrier which automatically unfolds from a retracted configuration when the droop nose device 30 is stowed (FIG. 2) to an extended configuration as the droop nose device 30 moves to its deployed position (FIGS. 3, 7 and 8). Note that the panel 50 is omitted from FIGS. 1 and 6 to make the gap 40 visible in these drawings. The infill panel may have a partially extended configuration corresponding to the partially deployed configuration of the droop nose device 30.

The infill panel 50 in this embodiment is required to have the capability to withstand the application of heat by a standard flame, as defined in AC 20.135 and ISO 2685, for a period of 5 minutes without any failure that would create a hazard to the aircraft.

The infill panel 50 is generally wedge shaped (i.e. shaped like a truncated triangle) so that it generally corresponds to the shape of the gap 40. It is arranged so that an upper edge 51 is attached to the inboard pylon rib 12 by an upper bracket (not shown), a lower edge 52 is attached to the droop nose device by a lower bracket 37 (FIG. 8) next to the lateral edge 32 of the lower part 33 of the droop nose device, and a narrow edge 53 is at the narrow aft part of the gap near the pivot 27. Thus, the infill panel 50 is substantially planar when in its extended configuration.

Note that the precise position of the upper bracket (not shown) attaching the upper edge 51 to the inboard pylon rib 12 may vary—for instance it may be positioned above the lower edge of the rib 12 as shown in FIGS. 2 and 3, or close to the lower edge of the rib 12 as shown in FIG. 8. The upper bracket (not shown) would be similar to lower bracket 37 with one addition—a strip of metal would be used on the other side to prevent the fasteners pulling through the panel 50 and able to clamp it in the middle (similar to a sandwich).

The infill panel 50 has a plurality of fold lines 54 which radiate, i.e. diverge/fan out, outwardly from the narrow edge 53 to enable the panel 50 to fold in a concertina-type, or fan-type, arrangement, with the fold lines 54 providing a series of folds in alternating directions. Thus, the infill panel 50 is retracted into a compact folded arrangement when in its retracted configuration. In this example the panel 50 has six fold lines 54 as shown in FIG. 8, although in an alternative embodiment it may have only one fold line. In its partially extended configuration the infill panel 50 will be partially folded, so that it is neither fully folded nor fully unfolded.

The infill panel 50 comprises an aircraft grade polyurethane or silicon rubber substrate with the required fire resistant properties. ABR4-0085 grade A is a suitable flame resistant silicon rubber which can be used on its own or with an exterior layer of glass fibre added to further increase fire resistance. Suitable grades of glass fibre are ABR9-0142T6 or ABR9-0142T6.

A plurality of stiffening rods (not shown) are moulded in to the substrate, the rods providing additional stiffness to prevent the panel from lateral distortion. The rods are each located adjacent a fold line 54, and thus also serve to assist the folding operation. A suitable material for the stiffening rods would be aircraft grade stainless steel, for example stainless steel 316.

In an alternative embodiment the stiffening rods may be replaced by a plurality of wedge-shaped stiffening plates (not shown) moulded in to the substrate, neighbouring stiffening plates being separated by a fold line 54. Thus, when the panel 50 is folded into the retracted configuration the portions thereof containing the stiffening plates are stacked one on top of the other.

Depending on the expected buffeting loads which the infill panel 50 may be subjected to, the design may be able to omit the rods and/or stiffening plates and simply vary the thickness of the substrate material in the appropriate places to provide the appropriate mechanical properties. For instance the substrate material may be thin at the fold line(s) 54 to provide flexibility to fold, and thick on either side of the fold line(s) 54 to provide stiffness in the forward/aft direction.

In some embodiments a biasing element such as an elastomeric/memory shape material may be moulded into the infill panel 50 (or otherwise integrated into the panel) across/generally perpendicular to the fold line/lines 54. Such a material would become strained and store energy as the droop nose device is deployed and the infill panel 50 unfolded. Thus the panel is biased towards the folded position by the biasing element. This would ensure that the infill panel 50 folds in the correct direction and does not become caught between the fairing 10 and the droop nose device 30 as it folds.

The infill panel 50 may further include a reinforcement fabric layer (not shown) attached to its outwardly-facing surface in order to protect the panel from environmental damage such as damage from air-borne debris. The outwardly-facing surface may further be treated with a hydrophobic coating to prevent ice build-up. Ice build-up may prevent proper functioning of the panel 50, and may cause structural damage to it.

Although not illustrated in the accompanying drawings, an infill panel 50 with substantially similar features to that shown in FIGS. 2 and 3 may be fitted at the inboard end of the droop nose device 30. Here, the droop nose device 30 pivots relative to an inner fixed leading edge assembly (the root end fillet fairing) with an outboard closing rib similar to the inboard pylon closing rib 12 of the fairing 10. A generally triangular aperture similar to gap 40 is created relative to the root end fillet fairing when the droop nose device 30 is deployed.

Although there is no particular requirement to prevent ingress of fire through this aperture since it is sufficiently far from the aircraft engine, an infill panel may be required to prevent debris thrown up by the landing gear (not shown) during take-off or landing from passing through the aperture and causing damage to critical systems infrastructure and/or structural members (such as the front spar 20), exposed during deployment of the droop nose device. In such embodiments where prevention of damage from debris is a key requirement the panel 50 may comprise a substrate with a high rubber content, such as a fabric-reinforced rubber material, or fabric reinforce polyurethane).

Figure 9:
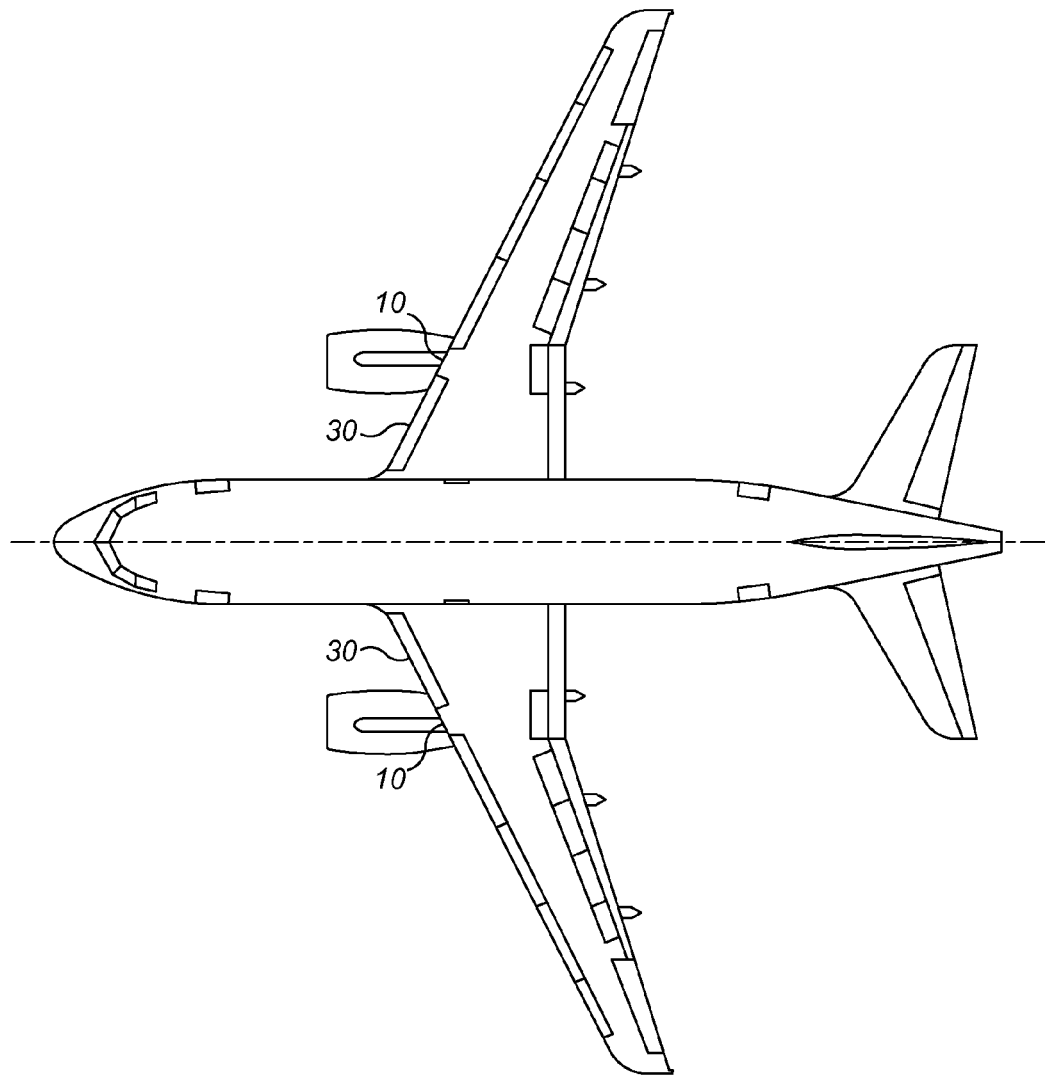
FIG. 9 is a plan view of an aircraft incorporating the assembly of FIGS. 1-8.

An aircraft with two wings each incorporating the assembly of FIGS. 1-8 is shown in FIG. 9. The droop nose device 30 and fairing 10 are shown for each wing.

Although the invention has been described above with reference to one or more preferred embodiments, it will be appreciated that various changes or modifications may be made without departing from the scope of the invention as defined in the appended claims.

In particular, the skilled person will understand that the purpose of the infill panel may be to provide aerodynamic improvements by preventing air flow through lateral gaps associated with such movable high-lift devices, rather than to prevent fire or debris ingress.

The invention claimed is:

1. An aircraft assembly comprising:
a fixed structure comprising a spar, a forward part which provides a fixed foremost edge of an aircraft wing, and a lower part which provides a fixed lower surface of the aircraft wing;
a high-lift device connected to the spar so as to be downwardly movable relative to the fixed structure from a stowed configuration to a deployed configuration, wherein the high-lift device comprises a forward part which provides a movable foremost edge of the aircraft wing and a lower part which provides a movable lower surface of the aircraft wing, and wherein downward movement of the high-lift device causes progressive opening of a lateral gap between the lower part of the high-lift device and the lower part of the fixed structure;
a retractable infill panel arranged to progressively extend from a retracted configuration to an extended configuration to fill the lateral gap, and wherein the infill panel is arranged to provide a lateral barrier to one or more of: fire; debris; and air flow.

2. An aircraft assembly according to claim 1, wherein the infill panel is attached to the high-lift device and to the fixed structure.

3. An aircraft assembly according to claim 2 wherein the fixed structure further comprises a rib, the forward and lower parts of the fixed structure are attached to the rib, and the infill panel is attached to the rib.

4. An aircraft assembly according to claim 1, wherein in the retracted configuration the infill panel is folded and in the extended configuration the infill panel is unfolded.

5. An aircraft assembly according to claim 4, wherein the infill panel is arranged to fold at one or more fold lines which provide a series of folds in alternating directions.

6. An aircraft assembly according to claim 1, wherein the infill panel comprises a flexible substrate supported by a plurality of stiffening portions.

7. An aircraft assembly according to claim 6, wherein the infill panel is arranged to fold at each of a plurality of fold lines in the flexible substrate, each fold line being adjacent one of the plurality of stiffening portions.

8. An aircraft assembly according to claim 6, wherein each of the stiffening portions comprises an elongate rod.

9. An aircraft assembly according to any of claims 6, wherein each of the stiffening portions comprises a moulded-in stiffening plate, neighbouring stiffening plates being separated by a fold line.

10. An aircraft assembly according to claim 1 further comprising an upper fixed secondary structure connected to the spar, wherein the high-lift device further comprises an upper part which seals with the upper fixed secondary structure in the stowed position and/or the deployed position.

11. An aircraft assembly according to claim 10 wherein the upper fixed secondary structure terminates at a lower edge which is spaced apart from the spar by a gap.

12. An aircraft assembly according to claim 1 further comprising a lower fixed secondary structure connected to the spar, wherein the lower part of the high-lift device seals with the lower fixed secondary structure in the stowed position and/or the deployed position.

13. An aircraft assembly according to claim 11 wherein the upper and lower fixed secondary structures are spaced apart by a gap.

14. An aircraft assembly according to claim 1, wherein the high-lift device has a partially deployed configuration between the stowed configuration and the deployed configuration, and the a retractable infill panel is arranged to progressively extend from the retracted configuration to a partially extended configuration to fill the lateral gap when the high-lift device deploys from the stowed configuration to the partially deployed configuration.

15. An aircraft wing comprising an aircraft assembly according to claim 1.

16. An aircraft assembly according to claim 1, wherein the lower part of the high-lift device lies flush with the lower part of the fixed structure when the high-lift device is in its stowed configuration.

17. An aircraft assembly according to claim 1, wherein the forward part of the high-lift device lies flush with the forward part of the fixed structure when the high-lift device is in its stowed configuration.

18. An aircraft assembly according to claim 1, wherein the high-lift device has an inboard and an outboard end, the inboard end being positioned closer to a centre plane of the aircraft than the outboard end, and the lateral gap is at the inboard end or the outboard end of the high lift device.

* * * * *